United States Patent Office 3,392,208
Patented July 9, 1968

3,392,208
METHOD FOR PREPARING ALIPHATIC TRIENES
Wolfgang Schneider, Broadview Heights, Ohio, assignor to The B. F. Goodrich Company, New York, N.Y., a corporation of New York
No Drawing. Filed Sept. 28, 1965, Ser. No. 491,036
9 Claims. (Cl. 260—677)

ABSTRACT OF THE DISCLOSURE 1,4,9-decatrienes are useful third monomers in preparing sulfur-vulcanizable elastomers with olefins including ethylene and propylene and are prepared by reacting ethylene with conjugated dienes, butadiene or isoprene, in the presence of a catalyst formed by reacting a reducible compound of nickel with reducing agents including alkali, alkaline earth and aluminum metals, hydrides, alkoxides and alkyls thereof, and an aryl halide.

---

This invention relates to an improved method for preparing 1,4,9-decatrienes.

1,4,9-decatrienes, including 1,4,9-decatriene and dimethyl-1,4,9-decatrienes, are useful third monomers in preparing sulfur-vulcanizable elastomers of ethylene and propylene. In the preparation of 1,4,9-decatriene by known methods, the yield has been lower than is desirable so that the cost of this material for use in preparing interpolymers thereof has been higher than is required for large volume commercial production of such interpolymers. I have now discovered a novel and improved process for preparing 1,4,9-decatrienes in good yields and high conversions which comprises reacting a conjugated diene such as butadiene or isoprene with ethylene in the presence of a catalyst which is formed by reacting together in the presence of the 1,3-diene a reducible compound of nickel with a reducing agent such as alkali, alkaline earth and aluminum, metals, hydrides, alkoxides and alkyls thereof, and an aryl halide.

The reducible nickel compounds are those which are readily reduced by an alkyl metal compound. Useful nickel compounds include the halides as the chlorides and bromides, sulfates, hydroxides, nitrates, acetates, oxalates, and salts of inorganic and organic acids, and coordination compounds which are organic compounds of nickel, as the chelates, in which the nickel atom is attached to two functional groups of a molecule by a main valence bond and coordinately; for example, nickel acetylacetonate.

The aryl halides useful in the practice of this invention include chlorine derivatives, as chlorobenzene, a-chloronaphthalene, chlorothiophene, B-chloronaphthalene, chlorobenzonitrile, chlorotoluene, chlorodiphenyl, chlorofluorobenzene, chlorodiphenylmethane, chloronitrobenzene, dichlorobenzene, chlorophenol, dichloronaphthalene, chloroethyltoluene, chloromethylaniline, trichlorobenzene, chloroanisole, dichlorobenzophenone, and the like. Generally used are phenyl, benzyl, naphthyl, diphenyl, dibenzyl, diphenylmethane and the like derivatives containing 1 to 6 chlorine atoms. Generally the aryl halides have the general formula $RX_y$ wherein R is phenyl or naphthyl and $y$ is 1 to 4 and X is chlorine or fluorine. Fluorine derivatives of the above compounds also are useful.

The reducing agents, which may be I-A, II-A, or III-A metals, hydrides, or alkyl derivatives thereof, are usually organo-metallic compounds, including lithium alkyls, beryllium alkyls, aluminum alkyls, mixtures of alkali, alkaline earth and aluminum metals and alkyl halides, and alkoxides, and the like. More usually employed are aluminum alkyls, alkyl alkoxides, hydrides and aluminum alkyl halides having the formula $R_3Al$ or $R_xAlX_y$ wherein R is an alkyl group containing 1 to 12 carbon atoms, preferably 2 to 8, X is an alkoxyl, hydride or a halogen atom, and $x$ is 1 or 2, $y$ is 1 or 2, and $x+y=3$. Typical compounds include triethyl aluminum, tributyl aluminum, triisobutyl aluminum, diethyl aluminum chloride, dibutyl aluminum chloride, ethyl aluminum dichloride, diethyl aluminum ethoxide, propyl aluminum dichloride, diisobutyl aluminum chloride, and mixtures thereof. Other useful organo-metallic compounds include zinc diethyl and Grignard reagents as ethyl magnesium bromide and other alkyl magnesium halides, also wherein the alkyl group contains 1 to 12 carbon atoms.

In addition to the organo-metallic compounds, metals which have a reducing action on nickel compounds can be used as reducing agents, for example metals belonging to I-A, II-A or III-A or the Lanthanide group of the Periodic Table. Of these metals it is preferred to use lithium, sodium, potassium, magnesium, calcium, strontium, beryllium, barium, aluminum, gallium, indium, and cerium. They are conveniently used in a condition in which they have a large surface, for example, in the form of chips or powder. Obviously, alloys or mixtures of two of the said metals may also be used. In many cases the use of an alkyl or aryl halide or a halide of an element of Group II-A or III-A along with the metal is of advantage. Of the halides, the bromides and chlorides are preferred. Examples of suitable compounds are: allyl chloride and bromide, ethyl chloride and bromide, boron trichloride, aluminum chloride, and the like.

In the preparation of the catalyst, the nickel compound and reducing agent are reacted together in the presence of a conjugated diene. The aryl chloride may be added during this reaction or thereafter. Suitable 1,3-dienes are butadiene-1,3, isoprene and the like.

The reaction may be conducted over a wide range of temperatures and pressures. Normally, the reaction is conducted at a temperature above room temperature, that is, about 25° C. to temperatures as high as about 250° C. More preferably, the reactions are conducted at temperatures in a range of about 50° C. to 150° C. Higher temperatures favor formation of the trienes.

The reaction may be carried out at atmospheric pressure, but usually is at higher pressure. This is determined by the vapor pressure of the 1,3-diene and the solubility of ethylene in the 1,3-diene at that temperature and pressure. The pressure of the reactor may range from about 100 p.s.i.g. to about 5,000 p.s.i.g. and more normally at pressures of about 200 p.s.i.g. to about 1,000 p.s.i.g., more preferably less than 1,000 p.s.i.g. as 500 p.s.i.g. if no solvent is present.

The molar ratio of reactants include from about $10^{-1}$ to $10^{-8}$, preferably $10^{-3}$ to $10^{-5}$ mol of nickel per mol of diene; 0.1 to 10 mols of aryl chloride per mol of nickel, preferably 0.25 to 2 mols per mol equivalent of nickel; and 1 mol equivalent of nickel to 1 to 10 mol equivalents of reducing compound per mol of nickel. On a weight basis, per 100 weight parts of conjugated 1,3-diene, from $10^{-1}$ to $10^{-3}$ weight parts of nickel acetylacetonate, about $10^{-1}$ to $10^{-4}$ weight percent aryl chloride and about 1 to $10^{-3}$ weight percent reducing agent may be used. Large amounts of catalysts may be used but are not required.

It is convenient to carry out the process without a solvent. If it is desired to use solvents, suitable solvents include aliphatic, cycloaliphatic and aromatic hydrocarbons, such as hexane, heptane, cyclooctane, benzene, hydrocarbon mixture of petroleums boiling between 60 and 200° C. Purified anhydrous starting materials and solvents are employed.

A general procedure for preparation of the 1,4,9-decatrienes is carried out by suspending the nickel compound and aryl chloride in the conjugated diene. This mixture is cooled to below about 0° C. The reducing agent is added slowly over a period of time. The mixture is agitated while maintaining the temperature at about −10° C. to 0° C. The resulting solution is then placed in an autoclave pressured with ethylene and heated at about 60 to 95° C. at 500 p.s.i. for several hours. The autoclave is then cooled and depressured, and the 1,4,9-decatriene isolated by distillation. The following examples demonstrate specific embodiments of the invention.

Example I

In a reactor 123 grams of 1,3-butadiene was cooled to −10° C. and 1 gram of nickel acetylacetonate was stirred into the butadiene. Thereafter 3 ml. of triisobutyl aluminum and 0.113 gram of chlorobenzene were stirred into the butadiene-1,3. After about 30 minutes with agitation this catalyst solution was charged to a cold 320 ml. autoclave and 42 grams of ethylene charged into the autoclave. The reactor was then heated at 80° C. for 65 hours. The reactor was vented and the unreacted butadiene-1,3 and ethylene flashed off. A conversion of 97% and yield of 63.6 weight percent of 1,4,9-decatriene was obtained. When this example is repeated with isoprene instead of butadiene-1,3 improved yields of dimethyl-1,4,9-decatriene were obtained.

Example II

In a reactor 190 ml. of 1,3-butadiene was cooled to −10° C. and 1 gram of nickel acetylacetonate was stirred into the butadiene. Then 0.33 gram of a-chloronaphthalene was stirred into the butadiene-1,3 and thereafter 3 ml. of triisobutyl aluminum was added. After about 30 minutes with agitation this catalyst solution was charged to a cool 320 ml. autoclave and 43 grams of ethylene charged into the autoclave. The reactor was then heated to 80° C. for 65 hours. The reactor was vented and the unreacted butadiene-1,3 and ethylene flashed off. A yield of 63% of 1,4,9-decatriene was obtained at a conversion of 96%. 26% cyclodecadiene was also obtained. When this example was repeated with diethyl aluminum hydride or diethyl aluminum chloride in place of triisobutyl aluminum similar improved yields of 1,4,9-decatriene were obtained.

Example III 90 grams of nickel acetylacetonate and 51 grams of o-dichlorobenzene were suspended in 3 quarts of butadiene at a temperature of about −10° C. 180 ml. triisobutyl aluminum in 300 ml. of benzene was slowly added to the mixture. The resulting catalyst solution was then charged under an inert gas to a 15 gallon reactor which contained 9 gallons of butadiene-1,3. The reactor was heated to 58–63° C. and the reaction was conducted in the presence of ethylene under a pressure of 2000 p.s.i.g. ethylene for 15 hours. A yield of 51.8% of high purity 1,4,9-decatriene was obtained at a conversion of 99%. When this example was repeated 34 grams of 2,4,6-trichloroaniline for 15 hours, at 600 p.s.i.g. and 95° C., a conversion of 99% and yield of 61.8% 1,4,9-decatriene was obtained.

Example IV

A series of runs following the procedure of Example I were made. The amounts of reactants, reaction conditions and yields are set forth in the table below. 1 gram (3.9 millimols) of nickel acetylacetonate and 2 ml. of triisobutyl aluminum were used in each example. Unless noted, the reactions were run for 65 hours at 80° C.

| Butadiene, grams | Ethylene, grams | Aryl Chloride | Gram | 1,4,9-decatriene conversion, percent | Yield, percent |
|---|---|---|---|---|---|
| 120 | 52 | 2-chloronaphthalene | 0.63 | 96 | 63.6 |
| 122 | 41 | 2-chlorothiophene [1] | 0.24 | 89 | 60.7 |
| 113 | 50 | m-Chlorobenzonitrile [1] | 0.28 | 97 | 58.5 |
| 123 | 37 | 1-chloro-3-fluorobenzene [1] | 0.51 | 95 | 55.2 |
| 113 | 55 | 1-chloro-4-nitrobenzene | 0.32 | 97 | 55.8 |
| 124 | 43 | p-chlorophenol [2] | 0.26 | 96 | 44.8 |
| 107 | 52 | 3-chloro-2-methylaniline | 0.28 | 94 | 52.2 |
| 120 | 49 | p-Chloroanisole | 0.48 | 97 | 64.5 |
| 117 | 40 | Dichloronaphthalene | 0.39 | 92 | 61.0 |
| 123 | 49 | 1,2,3-trichlorobenzene | 0.37 | 95 | 61.7 |
| 122 | 45 | 1,2,4,5-tetrachlorobenzene | 0.43 | 91 | 61.3 |
| 113 | 54 | 4,4′-dichlorobenzophenone | 0.98 | 96 | 55.3 |
| 114 | 47 | o-Chlorotoluene | 0.25 | 98 | 61.0 |
| 126 | 44 | 2-chloro-p-xylene | 0.28 | 96 | 55.2 |
| 121 | 50 | m-Chloroaniline | 0.26 | 96 | 60.7 |
| 119 | 52 | Fluorobenzene | 0.2 | 97 | 47.4 |

[1] 45 hours. [2] 90° C.

Example I was repeated with two other reducing agents, (1) 10 millimols of zincdiethyl and (2) 10 millimols of ethyl magnesium bromide, and nickel bromide, nickel dimethyl glyoxime and nickel oxalate. Excellent yields of 1,4,9-decatriene were obtained in each run.

The 1,4,9-decatrienes polymerize readily with ethylene and propylene to form sulfur-vulcanizable products. One commercial and economic advantage of this process is that polymerization grade butadiene-1,3 and isoprene are not required. Streams from ethylene cracking units which contain dienes may be used in preparing the 1,4,9-decatrienes.

I claim:

1. A method for preparing aliphatic 1,4,9-decatrienes which comprises reacting conjugated dienes containing 4 to 6 carbon atoms with ethylene in the presence of a catalyst comprising nickel in a reduced state prepared by reacting together a nickel compound and a reducing agent selected from the group consisting of I–A, II–A, and III–A metals and their hydride, alkyl and alkyl halide derivatives, and an aryl halide of chlorine or fluorine.

2. The method for preparing aliphatic 1,4,9-decatrienes which comprises reacting a conjugated diene selected from the group consisting of butadiene and isoprene with ethylene in the presence of a catalyst comprising a salt of nickel reacted with an aluminum compound having the structure $R_3Al$ or $R_xAlX_y$, wherein R is an alkyl group containing 1 to 12 carbon atoms, X is an alkoxyl, hydrogen or a halogen atom, $x$ is 1 or 2, $y$ is 1 or 2, and $x+y=3$, and an aryl chloride.

3. A method for preparing aliphatic 1,4,9-decatrienes which comprises reacting a conjugated diene selected from the group consisting of butadiene-1,3 and isoprene with ethylene in the presence of a catalyst comprising the reaction product of a nickel salt in a concentration of from $10^{-3}$ to $10^{-5}$ mol of nickel per mol of butadiene-1,3 or isoprene, 1 to 10 mol equivalents of an alkyl aluminum compound having the structure $R_3Al$ and $R_xAlX_y$ wherein R is an alkyl group containing 1 to 12 carbon atoms, X is a halogen atom, $x$ is 1 or 2, $y$ is 1 or 2, and $x+y=3$, to 1 mol equivalent of nickel and 0.1 to 10 mols of an aryl halide having the formula $RX_y$ wherein R is an aryl radical containing 6 to 12 carbon atoms and X is chlorine or fluorine and $y$ is 1 to 4.

4. The method of claim 2 wherein the nickel salt is an acetylacetonate, the aluminum compound has the formula $R_3Al$ and the aryl chloride is a phenyl or naphthyl chloride.

5. A method for preparing aliphatic 1,4,9-decatrienes which comprises reacting a conjugated diene selected from the group consisting of butadiene-1,3, isoprene or piperylene with ethylene in the presence of a catalyst comprising a salt of nickel reacted with an aluminum alkyl, and an aryl chloride.

6. A method for preparing aliphatic 1,4,9-decatrienes which comprises reacting a conjugated diene selected from the group consisting of butadiene-1,3, isoprene or piperylene with ethylene in the presence of a catalyst comprising nickel acetylacetonate reacted with an alkyl magnesium halide, and an aryl chloride.

7. The method for preparing aliphatic 1,4,9-decatrienes which comprises reacting a conjugated diene selected from the group consisting of butadiene-1,3, or isoprene with ethylene in the presence of a catalyst comprising a nickel salt in a concentration of from $10^{-3}$ to $10^{-5}$ mol of nickel per mol of butadiene-1,3 or isoprene, 1 to 10 mol equivalents of an alkyl aluminum compound having the formula $R_3Al$ wherein R is an alkyl radical containing 2 to 8 carbon atoms, to 1 mol equivalent of nickel, and 0.1 to 10 mols of an aryl chloride selected from the group consisting of phenyl and naphthyl chloride containing 1 to 4 chlorine atoms per mol equivalent of nickel.

8. The method of claim 7 wherein the salt is nickel acetylacetonate, the alkyl aluminum compound is triisobutyl aluminum and the aryl chloride is a chlorobenzene.

9. The method of claim 7 wherein the salt is nickel acetylacetonate, the alkyl aluminum compound is triisobutyl aluminum and the aryl chloride is a chloronaphthalene.

References Cited
UNITED STATES PATENTS

| | | | |
|---|---|---|---|
| 2,349,173 | 5/1944 | Joshel | 260—666 |
| 3,306,948 | 2/1967 | Kealy | 260—680 |

DELBERT E. GANTZ, *Primary Examiner.*

J. D. MYERS, *Assistant Examiner.*